United States Patent
Murtaza et al.

(10) Patent No.: US 12,312,531 B2
(45) Date of Patent: May 27, 2025

(54) OKRA COMPOSITION AS A SHALE SWELLING INHIBITOR IN WATER-BASED DRILLING FLUIDS

(71) Applicant: KING FAHD UNIVERSITY OF PETROLEUM AND MINERALS, Dhahran (SA)

(72) Inventors: Mobeen Murtaza, Dhahran (SA); Mohammad Shahzad Kamal, Dhahran (SA); Mohamed Mahmoud, Dhahran (SA); Dhafer A. Al-Shehri, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 271 days.

(21) Appl. No.: 18/302,853

(22) Filed: Apr. 19, 2023

(65) Prior Publication Data

US 2024/0158684 A1  May 16, 2024

Related U.S. Application Data

(60) Provisional application No. 63/424,512, filed on Nov. 11, 2022.

(51) Int. Cl.
*C09K 8/035* (2006.01)
*C09K 8/14* (2006.01)
*C09K 8/20* (2006.01)

(52) U.S. Cl.
CPC .............. *C09K 8/206* (2013.01); *C09K 8/145* (2013.01)

(58) Field of Classification Search
CPC ..... C09K 8/206; C09K 8/145; C09K 2208/12
See application file for complete search history.

(56) References Cited

U.S. PATENT DOCUMENTS

| | | | |
|---|---|---|---|
| 2012/0157354 A1 | 6/2012 | Li et al. | |
| 2012/0322695 A1 | 12/2012 | Kefi et al. | |
| 2017/0247602 A1 | 8/2017 | Belakshe et al. | |
| 2020/0131420 A1* | 4/2020 | Carpenter | C09K 8/035 |

OTHER PUBLICATIONS

Murtaza-1 (M. Murtaza, et. al., Okra as an environment-friendly fluid loss control additive for drilling fluids: Experimental & modeling studies, Journal of Petroleum Science and Engineering 204 (2021) 108743).*
Murtaza-2 (M. Murtaza, et. al., Okra mucilage as environment friendly and non-toxic shale swelling inhibitor in water based drilling fluids. Fuel 320 (2022) 123869, p. 1-9).*
Murtaza-3 (M. Murtaza, et. al., Application of okra mucilage for the prevention of shale swelling, SPE-207281-MS, 2021, 1-7).*
Ihekoronye et al. ; Evaluating the rheological property of Irvingia gabonensis and Abelmoschus esculentus as a substitute to conventional Pac-R on cutting carrying capacity and hole cleaning ; Journal of Petroleum Exploration and Production Technology ; Nov. 7, 2019 ; 11 Pages.
Murtaza et al. Okra as an environment-friendly fluid loss control additive for drilling fluids: Experimental & modeling studies ; Journal of Petroleum Science and Engineering, vol. 204 ; Apr. 7, 2021 ; 3 Pages ; Abstract Only.
Murtaza et al. ; Okra mucilage as environment friendly and non-toxic shale swelling inhibitor in water based drilling fluids ; Fuel 320 ; Mar. 24, 2022 ; 9 Pages.
Murtaza et al. ; Application of Okra Mucilage for the Prevention of Shale Swelling ; Society of Petroleum Engineers ; 2021 ; 7 Pages.

* cited by examiner

*Primary Examiner* — Kumar R Bhushan
(74) *Attorney, Agent, or Firm* — Oblon, McClelland, Maier & Neustadt, L.L.P.

(57) ABSTRACT

A drilling fluid includes an aqueous base fluid; 1 to 30 wt. % of an okra composition; 10 wt. % of clay particles; and 0.005 to 0.5 wt. % of a base, each wt. % based on a total weight of the drilling fluid composition. The okra composition is uniformly disposed on surfaces of the clay particles. The clay particles disposed with the okra composition are present in the drilling fluid composition in the form of a composite. A pellet made from the clay particles treated with the okra composition has a swelling value at least 75% less than a swelling value of the pellet in an aqueous composition that does not contain the okra composition, as determined by a linear swell meter. A method of making the drilling fluid composition.

20 Claims, 11 Drawing Sheets

OKRA COMPOSITION AS A SHALE SWELLING INHIBITOR IN WATER-BASED DRILLING FLUIDS

CROSS-REFERENCE TO RELATED APPLICATIONS

This application claims the priority of the filing date of the U.S. provisional patent application No. 63/424,512 filed Nov. 11, 2022, the disclosure of which is incorporated herein by reference in its entirety.

STATEMENT REGARDING PRIOR DISCLOSURES BY THE INVENTORS

Aspects of this technology are described in "Okra mucilage as environment friendly and non-toxic shale swelling inhibitor in water based drilling fluids," Fuel, Volume 320, 2022, 123868, which is incorporated herein by reference in its entirety.

Aspects of this technology are also described in "Application of okra mucilage for the prevention of shale swelling," presented at the Abu Dhabi International Petroleum Exhibition & Conference, Abu Dhabi, UAE, 2021, SPE-207281-MS, which is incorporated herein by reference in its entirety.

BACKGROUND

Technical Field

The present disclosure is directed to a water-based drilling fluid, particularly a plant-based drilling fluid, for use as a shale inhibitor.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The first and most expensive step in oil and gas well development is drilling the wellbore, which poses a threat to its stability. The drilling industry faces severe economic losses due to mechanical failures resulting from the interactions between shale and different additives of water-based muds (WBMs) [Moslemizadeh A, Shadizadeh S R. A natural dye in water-based drilling fluids: swelling inhibitive characteristic and side effects. Petroleum 2017; 3:355-66]. Interactions between drilling fluids and different types of clay and clay minerals can lead to wellbore instability, resulting in shale swelling. Shale swelling is a serious concern that can disrupt the entire drilling process. Hence, it is crucial to monitor and control shale swelling during drilling operations to avoid operational problems [Ahmad H M, Kamal M S, Hussain S M S, Al-Harthi M. Synthesis of novel copolymer based on N-Vinyl caprolactam and acrylamide monomers for high-temperature drilling applications 2020:020049; Ahmad H M, Murtaza M, Kamal M S, Hussain S M S, Mahmoud M. Cationic gemini surfactants containing biphenyl spacer as shale swelling inhibitor. J Mol Liquids 2021; 325:115164; Ahmad H M, Kamal M S, Hussain S M S, Al-Harthi M. Synthesis of novel polymer nanocomposite for water-based drilling fluids 2020:020057; and Ahmed H M, Kamal M S, Al-Harthi M. Polymeric and low molecular weight shale inhibitors: a review. Fuel 2019; 251:187-217].

In the case of oil-based muds (OBMs), shale swelling is not a concern due to the absence of water in the formulation [Yang X, Shang Z, Shi Y, Peng Y, Yue Ye, Chen S, et al. Influence of salt solutions on the permeability, membrane efficiency and wettability of the Lower Silurian Longmaxi shale in Xiushan, Southwest China. Appl Clay Sci 2018; 158:83-93]. However, environmental issues associated with OBMs have restricted their applications, and WBMs are the preferred choice for drilling wellbores [Davies J M, Addy J M, Blackman R A, Blanchard J R, Ferbrache J E, Moore D C, et al. Environmental effects of the use of oil-based drilling muds in the North Sea. Mar Pollut Bull 1984]. To minimize shale swelling, clay swelling inhibitors, also known as "shale inhibitors," are added to WBMs. The presence of shale inhibitors in WBMs is necessary to avoid hydration, swelling, and disintegration during the drilling process. Shale inhibitors are designed to improve the hydrophobic characteristics of clay surfaces that can minimize water interactions with clay surfaces. Potassium chloride (KCl) is one of the most commonly used shale inhibitors in the industry [Shi X, Wang L, Guo J, Su Q, Zhuo X. Effects of inhibitor KCl on shale expansibility and mechanical properties. Petroleum 2019; 5:407-12].

Nanomaterials, polymers, ionic liquids, natural products, and surfactants are also being used for this purpose; however, they are not environmentally friendly. In recent years, significant efforts have been made to develop effective, environmentally friendly, and non-toxic shale inhibitors [Rana A, Arfaj M K, Saleh T A. Advanced developments in shale inhibitors for oil production with low environmental footprints—A review. Fuel 2019].

TABLE 1

Environment-friendly and nontoxic classes of additives for shale swelling inhibition Inhibitors

| | |
|---|---|
| Amines and Imines | Patel A D. Design and development of quaternary amine compounds: Shale inhibition with the improved environmental profile. In: Proceedings - SPE International Symposium on Oilfield Chemistry; 2009; Zhong H, Qiu Z, Huang W, Cao J. Poly (oxypropylene)-amidoamine modified bentonite as potential shale inhibitor in water-based drilling fluids. Appl Clay Sci 2012; 67-68: 36-43; Guancheng J, Yourong Q, Yuxiu A, Xianbin H, Yanjun R. Polyethyleneimine as shale inhibitor in drilling fluid. Appl Clay Sci 2016; and Zhang Li, Li T, Huang L, Ye Z, Ye Z, Yan X, et al. Preparation and application of melamine cross-linked poly ammonium as shale inhibitor. Chem Cent J 2018; 12: 44. |
| Acrylamides | Xu J, Qiu Z, Huang W, Zhao X. Preparation and performance properties of polymer latex SDNL in water-based drilling fluids for drilling |

TABLE 1-continued

Environment-friendly and nontoxic classes of additives for shale swelling inhibition Inhibitors

|  |  |
|---|---|
|  | troublesome shale formations. J Nat Gas Sci Eng 2017]; Jain R, Mahto V. Evaluation of polyacrylamide/clay composite as a potential drilling fluid additive in inhibitive water-based drilling fluid system. J Petrol Sci Eng 2015; 133: 612-21; and Jain R, Mahto V. Formulation of water-based drilling fluid system with synthesized graft copolymer for troublesome shale formations. J Nat Gas Sci Eng 2017; 38: 171-81. |
| Glycols and glycerol | Samaei SM, Tahmasbi K. The possibility of replacing oil-based mud with environmentally acceptable water-based glycol drilling mud for the iranian fields 2007.; Nikolaev N I, Tianle L, Zhen W, Guosheng J, Jiaxin S, Mingming Z, et al. The experimental study on a new type low-temperature water- based composite alcohol drilling fluid. Procedia Eng 2014; 73: 276-82; and Jiang G, Liu T, Ning F, Tu Y, Zhang L, Yu Y, et al. Polyethylene glycol drilling fluid for drilling in marine gas hydrates-bearing sediments: an experimental study., Energies 2011; 4. |
| Biomolecules | Zhang J, Chen G, Yang N W, Wang Y G. Preparation and evaluation of sodium hydroxymethyl lignosulfonate as an eco-friendly drilling fluid additive. Adv Mater Res 2012; 415-417: 629-32; Xuan Y, Jiang G, Li Y, Yang L, Zhang X. Biodegradable oligo (poly-l-lysine) as a high-performance hydration inhibitor for shale. RSC Adv 2015; 5: 84947-58; and Zhang J, Chen G, Yang N-W, Wang Y-G. Preparation of nitration-oxidation lignosulfonate as an eco-friendly drilling fluid additive. Pet Sci Technol 2014; 32: 1661-8. |
| Silicates | Murtaza M, Kamal M S, Mahmoud M. Application of a novel and sustainable silicate solution as an alternative to sodium silicate for clay swelling inhibition. ACS Omega 2020; Yang X, Shang Z, Liu H, Cai J, Jiang G. Environmental-friendly saltwater mud with nano-SiO2 in horizontal drilling for shale gas. J Petrol Sci Eng 2017; 156: 408-18; Fritz B, Jarrett M. Potassium silicate-treated water-based fluid: an effective barrier to instability in the fayetteville shale 2012; and McDonald M. A novel potassium silicate for use in drilling fluids targeting unconventional hydrocarbons 2012. |

Plant-based materials are an ideal substitute for toxic chemicals as they are a rich source of natural compounds, including amines, alkaloids, polyphenols, and tannins. These compounds can be extracted using simple and inexpensive methods, and they are a renewable resource that is readily available and environmentally friendly. Henna leaves have been shown to decrease linear swelling and have a beneficial effect on fluid loss control, outperforming traditional shale inhibitors in terms of performance and potential [Oseh J O, Norrdin M N A M, Farooqi F, Ismail R A, Ismail I, Gbadamosi A O, et al. Experimental investigation of the effect of henna leaf extracts on cuttings transportation in highly deviated and horizontal wells. J Pet Explor Prod Technol 2019; 9:2387-404].

Although shale inhibitors have been developed in the past, there still exists a need in the oil and gas drilling industry to develop plant-based shale inhibitors that are both effective and environmentally friendly. Also, due to the strict environmental regulations in place, the chemicals used in the oil and gas industry's drilling process must have a low ecological footprint. Accordingly, an objective of the present disclosure is to describe an okra composition that is biodegradable, non-accumulative, non-toxic, and that overcomes the limitations of the art. A second objective of the present disclosure is to describe a drilling fluid composition containing the okra composition. A further objective of the present disclosure is to describe a method of drilling a subterranean geological formation.

SUMMARY

In an exemplary embodiment, a drilling fluid composition is described. The drilling fluid composition includes an aqueous base fluid; 1 to 30 wt. % of an okra composition; to 10 wt. % of clay particles; and 0.005 to 0.5 wt. % of a base, where each wt. % based on a total weight of the drilling fluid composition.

In some embodiments, the okra composition is uniformly disposed on the surfaces of the clay particles. In some embodiments, the clay particles disposed with the okra composition are present in the drilling fluid composition in the form of a composite. In some embodiments, a pellet made from the clay particles treated with the okra composition has a swelling value at least 75% less than a swelling value of the pellet in an aqueous composition that does not contain the okra composition, as determined by a linear swell meter.

In some embodiments, the okra composition is an okra extract. In some embodiments, the clay is sodium bentonite. In some embodiments, the base is sodium hydroxide.

In some embodiments, the drilling fluid composition includes 5 to 20 wt. % of the okra extract; 3 to 5 wt. % of sodium bentonite; and 0.02 to 0.1 wt. % of sodium hydroxide; where each wt. % based on a total weight of the drilling fluid composition.

In some embodiments, the okra composition is at least one selected from the group consisting of an okra extract, an okra pressing, an okra homogenate, and any combination thereof.

In some embodiments, the okra composition comprises at least one polysaccharide selected from the group consisting of galacturonic acid, galactose, rhamnose, and arabinose.

In some embodiments, the at least one polysaccharide of the okra composition has a molecular weight in a range of 500 to 5000 Kilodaltons (kDa).

In some embodiments, the okra composition has a total sugar content of at least 60 wt. % based on a total weight of the okra composition and wherein the sugar is a polysaccharide.

In some embodiments, the clay comprises sodium bentonite, calcium bentonite, potassium bentonite, sodium montmorillonite, calcium montmorillonite, or a combination thereof.

In some embodiments, the base comprises an alkali metal hydroxide, an alkaline earth metal hydroxide, an alkali metal oxide, an alkaline earth metal oxide, an alkaline earth metal carbonate, or a mixture thereof.

In some embodiments, the aqueous base fluid comprises one or more selected from the group consisting of a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitor, a catalyst, a surfactant, a preservative, a biocide, a thermal stabilizer, and a combination thereof.

In some embodiments, the drilling fluid composition has a capillary suction time in a range of 50 to 300 seconds.

In some embodiments, the drilling fluid composition has a zeta potential in a range of −50 to −10 millivolts (mV).

In some embodiments, the drilling fluid composition has a zeta potential in a range of −30 to −15 mV.

In some embodiments, the drilling fluid composition has an average particle size (D50) in a range of 1 to 5 micrometers (μm).

In some embodiments, the drilling fluid composition has an average particle size (D50) of 1.5 to 4.5 μm.

In an exemplary embodiment, a method of making the drilling fluid composition is described. The method includes dispersing the clay particles in the aqueous base fluid to form a suspension, where the suspension has an average particle size (D50) in a range of 0.5 to 2 μm. The method further includes neutralizing the pH of the suspension with the base. Additionally, the method involves mixing an okra mucilage containing the okra composition with the suspension to form the drilling fluid composition, where the okra composition is present in the okra mucilage at a concentration of 0.1 to 10 g/ml.

In some embodiments, the method further includes preparing the okra mucilage containing the okra composition by pulverizing okra and heating in water at a temperature of at least 35° C. to form an okra-containing mixture; and further filtering the okra-containing mixture to form the okra mucilage containing the okra composition.

In an exemplary embodiment, a method of drilling a subterranean geological formation is described. The method includes drilling the subterranean geological formation to form a wellbore therein and further circulating the drilling fluid composition into the wellbore during the drilling.

In some embodiments, the wellbore has a temperature in a range of 75-400° F., and a pressure in a range of 250-1,000 psi.

In some embodiments, the subterranean geological formation is a shale formation.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
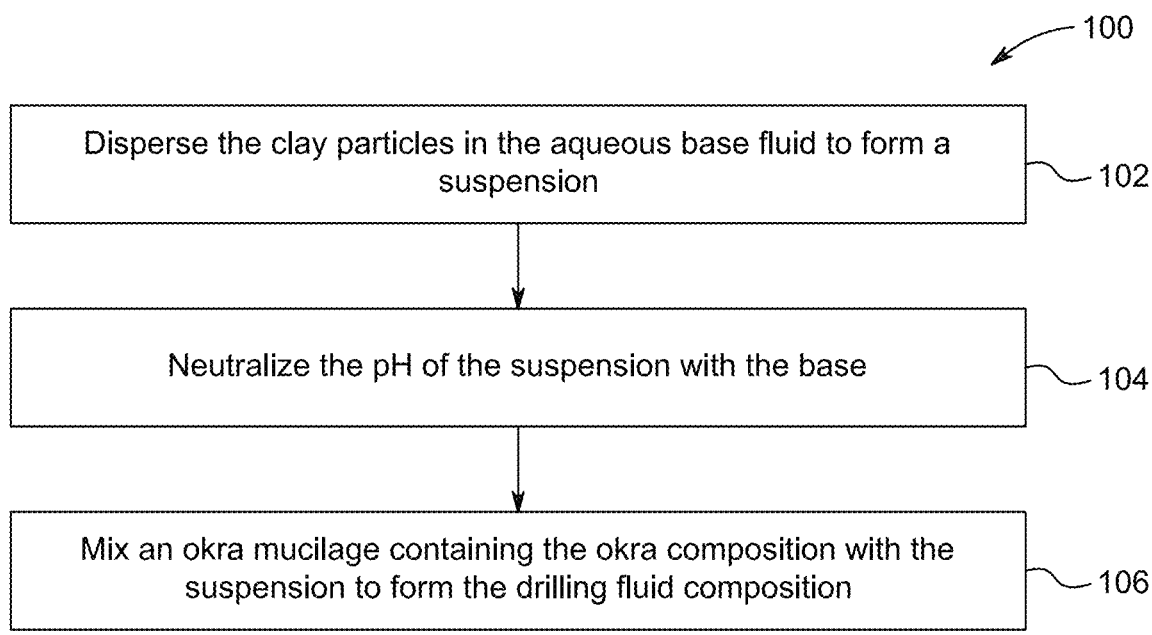
FIG. 1 is a schematic flow chart of a method of making a drilling fluid composition, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Conventionally used WBMs cause severe formation damage during the drilling operation when interacting with clay-containing formations. To avoid clay swelling, it is common practice to add swelling inhibitors in WBMs. Aspects of the present disclosure are directed to using a green, environmentally friendly clay swelling inhibitor, e.g., okra composition/okra mucilage.

The drilling fluid composition of the present disclosure includes an aqueous base fluid, okra composition, clay particles, and a base. Suitable examples of aqueous base fluid include fresh water, seawater, brine, or any other aqueous fluid compatible with the okra composition and the clay particles of the drilling fluid composition. The aqueous base fluid offers several advantages over the non-aqueous fluids as they are environmentally friendly, safe, and cost-effective. In some embodiments, these fluids may contain various additives to impart desirable chemical and physical properties to the composition.

In an embodiment, the additives include one or more selected from the group consisting of a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitor, a catalyst, a surfactant, a preservative, a biocide, a thermal stabilizer, and a combination thereof.

The surfactant may be nonionic, an anionic surfactant, a cationic surfactant, a viscoelastic surfactant, or a zwitterionic surfactant. Suitable examples of the surfactant include but are not limited to, ammonium lauryl sulfate, sodium lauryl sulfate (SLS), sodium dodecyl sulfate (SDS), alkylether sulfates, such as sodium lauryl ether sulfate (SLES, sodium myreth sulfate, docusate (dioctyl sodium sulfosuccinate), perfluorooctanesulfonate (PFOS), perfluorobutane sulfonate, alkyl-aryl ether phosphates, alkyl ether phosphates, octenidine dihydrochloride; cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), CHAPS (3-[(3-cholamidopropyl)dimethylammonio]-1-propanesulfonate), cocamidopropyl hydroxysultaine, ocamidopropyl betaine, phospholipids, and sphingomyelins. In some embodiments, the surfactant may include primary and secondary emulsifiers. Hereinafter, the primary and secondary emulsifiers are collectively referred to as the 'emulsifiers' or 'surfactants' and individually referred to as the 'emulsifier' or 'surfactant', unless otherwise specified. In some embodiments, the primary emulsifier is a polyaminated fatty acid. The primary emulsifier includes a lower hydrophilic-lyophilic balance (HLB) to the secondary emulsifier. In some embodiments, the primary emulsifier may include, but is not limited to, span 60, span 85, span 65, span 40, and span 20. In some embodiments, the primary emulsifier is sorbitan oleate, also referred to as the span 80. In some embodiments, the secondary emulsifier may include, but is not limited to, triton X-100, Tween 80, Tween 20, Tween 40, Tween 60, Tween 85, OP4, and OP7. In some embodiments, the secondary emulsifier includes a biosurfactant such as a rhamnolipid surfactant.

The fluid loss control additive is added to the drilling fluid to control the loss of the drilling fluid when injected into the subterranean geological formation. Suitable examples of the fluid loss control additive may include, but are not limited to, starch, polysaccharides, silica flour, gas bubbles (energized fluid or foam), benzoic acid, soaps, resin particulates, relative permeability modifiers, degradable gel particulates, hydrocarbons dispersed in fluid, and one or more immiscible fluids. In some embodiments, the fluid loss prevention agent may include corn starch and poly(vinyl butyral)-co-vinyl alcohol-co-vinyl acetate (PVBA).

The crosslinking agent is an additive of the drilling fluid composition that can react with multiple-strand polymers to couple molecules together, thereby creating a highly viscous fluid with a controllable viscosity. The crosslinking agent may include but is not limited to, metallic salts, such as salts of Al, Fe, B, Ti, Cr, and Zr, or organic crosslinkers, such as polyethylene amides and formaldehyde. The breaker is an additive in the drilling fluid that provides the desired viscosity reduction in a specified period. Suitable examples of breakers include, but are not limited to, oxidizing agents (oxidizing breakers), such as sodium chlorites, sodium bromate, hypochlorites, perborate, persulfates, peroxides, and enzymes.

Biocide is an additive in the drilling fluid composition that may kill microorganisms present in the drilling fluid. Suitable examples of the biocide include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial. Corrosion inhibitors are chemical compounds that decrease the corrosion rate of a material, more preferably a metal or an alloy, in contact with the drilling fluid. Suitable examples of corrosion inhibitors include, but are not limited to, imidazolines, and amido amines. In some embodiments, the corrosion inhibiting agent may include, but is not limited to, oxides, sulfides, halides, nitrates, preferably halides, of metallic elements of group IIIa to VIa, such as $SbBr_3$.

The clay stabilizer is an additive of the drilling fluid composition that aids in stabilizing shales and controlling swelling clays. Suitable examples of clay stabilizers include alkali metal halide salts. In some embodiments, the alkali metal halide salt is potassium chloride. In some embodiments, the alkali metal halide salt may include, but is not limited to, sodium chloride, lithium chloride, rubidium chloride, and cesium chloride. In some embodiments, the clay stabilizer may consist of an alkaline earth metal halide salt. In some embodiments, the alkaline earth metal halide salt may include, but is not limited to, calcium chloride, and magnesium chloride.

Scale inhibitors are additives added to the drilling fluid composition to inhibit the formation and precipitation of crystallized mineral salts that form scale. Suitable examples of scale inhibitors include, but are not limited to, phosphonates, acrylic co/ter-polymers, polyacrylic acid (PAA), phosphine poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. Certain other examples of scale inhibitors include phosphine, sodium hexametaphosphate, sodium tripolyphosphate, and other inorganic polyphosphates, hydroxy ethylidene diphosphonic acid, butane-tricarboxylic acid, phosphonates, itaconic acid, and 3-allyloxy-2-hydroxy-propionic acid. In some embodiments, the drilling fluid may include metal sulfide scale removal agents such as hydrochloric acid.

The pH-control agent is an additive added to the drilling fluid composition to adjust the pH of the drilling fluid. Suitable examples include sodium hydroxide, potassium hydroxide, lithium hydroxide, rubidium hydroxide, cesium hydroxide, monosodium phosphate, disodium phosphate, and sodium tripolyphosphate.

Optionally, the drilling fluid composition may contain filtration rate agents, such as sodium carbonate, to reduce the loss of fluids from a mud cake through pores while drilling oil and gas wells. In some embodiments, the drilling fluid may also include a deflocculant. Deflocculant is an additive to prevent a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho.

In some embodiments, the drilling fluid may also include a lubricant. Suitable examples of the lubricant may include, but are not limited to, polyalpha-olefin (PAO), synthetic esters, polyalkylene glycols (PAG), phosphate esters, alkylated naphthalenes (AN), silicate esters, ionic fluids, and multiply alkylated cyclopentanes (MAC). Furthermore, the drilling fluid composition may also include a chelating agent. Suitable examples of the chelating agent may include but are not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA).

The drilling fluid composition includes an okra composition, primarily added to minimize clay swelling during the drilling operation. In an embodiment, the okra composition is prepared from Saudi Arabia okra. The concentration of the okra composition may vary depending on the degree of clay swelling inhibition to be imparted to the composition, which may be obvious to a person skilled in the art. In an embodiment, the okra composition is about 1 to 30 wt. %, and more preferably between 10-20 wt. %, based on the total weight of the drilling fluid composition. Other ranges are also possible.

In an embodiment, the okra composition is at least one selected from the group consisting of an okra extract, an okra pressing, an okra homogenate, and any combination thereof.

As used herein, the term "extract" refers to a substance obtained by extracting a raw material, using a solvent system. In the present specification, the term "okra extract" refers to okra leaves, fruits, stems, roots, outposts, or mixtures thereof to be extracted.

As used herein, the term "pressing" generally refers to a process of applying pressure to the okra to extract by a press mean. The press mean may be one of a manual press, a hydraulic press, and a pneumatic press.

As used herein, the term "homogenate" generally refers to a broth, paste or extract.

In some embodiments, the okra composition includes several sugars that form at least 60 wt. % of the total weight of the okra composition, preferably at least 70 wt. %, preferably at least 80 wt. %, or even more preferably at least 90 wt. % based on the total weight of the okra composition. Other ranges are also possible. In an embodiment, the polysaccharides form the primary source of sugars in the okra composition. Suitable examples of polysaccharides in the okra composition include, but are not limited to, galacturonic acid, galactose, rhamnose, and arabinose. In some embodiments, the okra mucilage polysaccharide concentration is about 25% of galactose, 22% of rhamnose, 27% of galacturonic acid, and 11% of amino acids. In some preferred embodiments, the polysaccharide of the okra composition has a molecular weight in the range of 500 to 5000 kilodaltons (kDa), preferably 1000 to 4500 kDa, preferably 1500 to 4000 kDa, preferably 2000 to 3500 kDa, or even more preferably 2500 to 3000 kDa. Other ranges are also possible.

Adding clay or clay minerals/clay particles in drilling fluids modifies the dispersion's viscosity. Generally, the drilling operation is performed at high temperatures and pressure. Therefore, the clay minerals added to the composition should withstand these conditions. Suitable examples of clay that can be added to the drilling fluid composition include, but are not limited to, bentonite, kaolin, palygorskite, sepiolite, montmorillonite, and mixtures or salts thereof. Bentonites are smectite-rich clays often used in drilling fluids, and their composition varies from deposit to deposit. Such variations significantly affect the behavior of bentonite-based drilling fluids. Examples of clay that can be added to the composition include sodium bentonite, calcium bentonite, potassium bentonite, sodium montmorillonite, calcium montmorillonite, or a combination thereof.

One of the critical factors that affect the rheological properties of the drilling fluid composition is the concentration of the clay in the composition. It is desirable to have a concentration of 0.6 to 10 wt. % of clay particles based on the total weight of the drilling fluid composition. The polysaccharide chains in the okra composition interact with the clay particles, forming a compact structure on the filter cake, thereby preventing/reducing fluid loss to the wellbore formations.

The drilling fluid composition further includes 0.005 to 0.5 wt. % of a base based on the total weight of the drilling fluid composition, preferably 0.01 to 0.4 wt. %, preferably 0.1 to 0.3 wt. %, or even more preferably about 0.2 wt. %, based on the total weight of the drilling fluid composition. Other ranges are also possible. The base comprises an alkali metal hydroxide, an alkaline earth metal hydroxide, an alkali metal oxide, an alkaline earth metal oxide, an alkaline earth metal carbonate, or a mixture thereof. In some preferred embodiments, the base is sodium hydroxide.

In some embodiments, the okra composition is homogenously disposed on surfaces of the clay particles. In some embodiments, at least 70% surface area of the clay particles are covered by the okra composition based on a total surface area of the clay particles, preferably at least 80%, preferably at least 90%, preferably at least 95%, or even more preferably at least 99% based on the total surface area of the clay particles. Other ranges are also possible. In some embodiments, the clay particles disposed with the okra composition are present in the drilling fluid composition in the form of a composite.

The swelling inhibition was evaluated by conducting a linear swelling test, a capillary suction timer (CST), zeta potential, and particle size. Rheology and filtration experiments were conducted to evaluate the performance of the okra mucilage-contained drilling muds. The experimental investigations showed the inhibition potential of the okra mucilage. The okra mucilage reduced the clay swelling appreciably as compared to distilled water. Moreover, the okra mucilage showed comparable performance to a commonly used clay stabilizer (KCl) used in the industry. It was observed that the okra mucilage reduced the fluid loss and provided a thin filter cake. The rheological properties improved with the addition of the okra mucilage. The increase in the size of the clay particles and reduction in zeta potential demonstrated the inhibition properties of the okra mucilage. In addition, the okra mucilage reduced friction and provided lubricity.

In some embodiments, the drilling fluid composition has an average particle size (D50) in a range of 1 to 5 micrometers (µm), and more particularly, in a range of 1.5 to 4.5 µm. Other ranges are also possible.

In some embodiments, the drilling fluid composition has a pH in a range of 7 to 12, preferably 8 to 10, preferably 8.5 to 9.5, or even more preferably about 9. Other ranges are also possible.

The swelling inhibition capabilities of the drilling fluid composition were evaluated based on the capillary suction time and zeta potential studies. The results indicate that the drilling fluid composition has a capillary suction time in a range of 50 to 300 seconds; particularly, in a range of 68-275 seconds; and more particularly about 120 seconds. In some embodiments, the zeta potential ranges between −50 to −10 millivolts (mV); and more particularly, −30 to −15 mV, or even more particularly about −25 mV. In some further preferred embodiments, a pellet made from the clay particles treated with the okra composition has a swelling value at least 75% less than a swelling value of the pellet in an aqueous composition that does not contain the okra composition, preferably at least 60% less, preferably at least 50% less, or even more preferably at least 40% less than the swelling value of the pellet in the aqueous composition that does not contain the okra composition, as determined by a linear swell meter.

FIG. 1 illustrates a schematic flow chart of a method 100 of making the drilling fluid composition. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes dispersing the clay particles in the aqueous base fluid to form a suspension. The suspension has an average particle size ($D_{50}$) in a range of 0.5 to 2 μm, or more preferably about 1 μm. Suitable examples of clay that can be added to the aqueous base fluid include, but are not limited to, bentonite, kaolin, palygorskite, sepiolite, montmorillonite, and mixtures or salts thereof. The aqueous base fluid includes freshwater, seawater, brine, or any other aqueous fluid compatible with the okra composition and the clay particles of the drilling fluid composition. In some embodiments, the aqueous base fluid includes freshwater, seawater, brine, or any other aqueous fluid compatible with the okra composition and the clay particles of the drilling fluid composition.

At step 104, the method 100 includes neutralizing the pH of the suspension with the base. Suitable examples include sodium hydroxide, potassium hydroxide, lithium hydroxide, rubidium hydroxide, cesium hydroxide, monosodium phosphate, disodium phosphate, and sodium tripolyphosphate. In a preferred embodiments, the base is sodium hydroxide. In some more preferred embodiments, the sodium hydroxide is present in the drilling fluid composition at a concentration of 0.005 to 0.5 wt. % of by weight, preferably 0.01 to 0.4 wt. %, preferably 0.1 to 0.3 wt. %, or even more preferably about 0.2 wt. %, based on the total weight of the drilling fluid composition. Other ranges are also possible.

At step 106, the method 100 includes mixing an okra mucilage containing the okra composition with the suspension to form the drilling fluid composition. The concentration of the okra composition may vary depending on the degree of clay swelling inhibition to be imparted to the composition, which may be obvious to a person skilled in the art. In an embodiment, the okra composition is about 1 to 30 wt. %, and more preferably between 10-20 wt. %, or at a concentration of 0.1 to 10 g/ml, based on the total weight of the drilling fluid composition.

Figure 3:
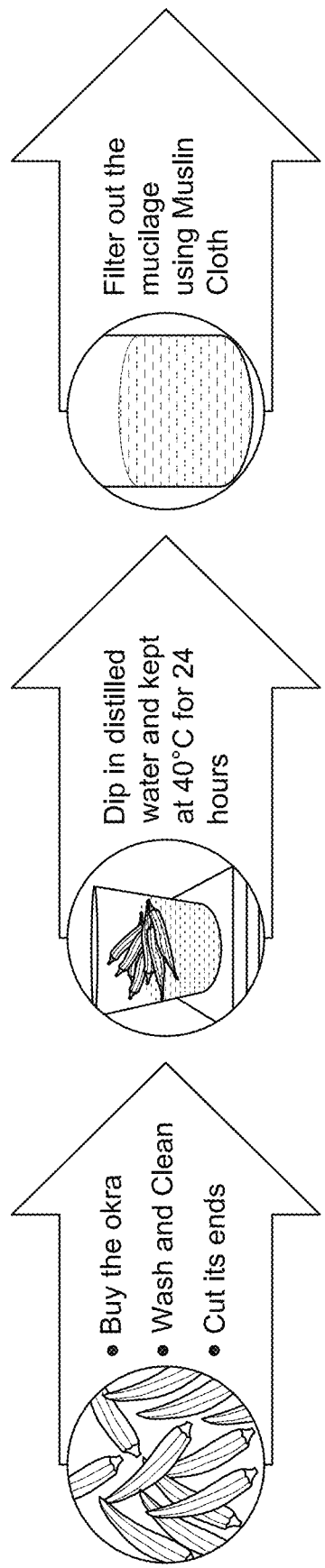
FIG. 3 is a schematic illustration depicting the preparation of the okra mucilage, according to certain embodiments.

In some embodiments, the okra mucilage containing the okra composition may be prepared by pulverizing okra and heating it in water at a temperature of at least 35° C. to form an okra-containing mixture, preferably at least 50° C., preferably at least 70° C., or even more preferably at least 100° C. to form the mixture, as depicted in FIG. 3. In some further preferred embodiments, the heating is performed for at least 2 hours, preferably at 12 hours, preferably at least 24 hours, or even more preferably at least 48 hours. Other ranges are also possible. The pulverization may be carried out with a mortar and pestle or using any other grinding techniques known in the art. The okra-containing mixture is further filtered to form the okra mucilage containing the okra composition. In some embodiments, the mixture is filtered by vacuum filtration via a filter paper and/or a muslin cloth, as depicted in FIG. 3. In some embodiments, the filter paper and/or the muslin cloth has an average pore size of less than 200 micrometers (μm), preferably less than 100 μm, preferably less than 50 μm, preferably less than 10 μm, or even more preferably less than 5 μm. In some further embodiments, the filter paper and/or the muslin cloth has an average pore size of more than 50 μm, preferably more than 100 μm, preferably more than 200 μm, preferably more than 300 μm, or even more preferably more than 500 μm. Other ranges are also possible.

In some embodiments, the okra composition is homogenously disposed on surfaces of the clay particles. In some embodiments, at least 70% surface area of the clay particles are covered by the okra composition based on a total surface area of the clay particles, preferably at least 80%, preferably at least 90%, preferably at least 95%, or even more preferably at least 99% based on the total surface area of the clay particles. In some embodiments, the okra composition-coated clay particles are in the form of a film after drying the drilling fluid composition. In some further embodiments, the film of the DPLE-coated clay particles formed after the drying has a smooth surface and a reduced porosity. As used herein, the term "porosity" generally refers to the fraction of void space within a porous material (e.g., clay particles). In some preferred embodiments, the film of the okra composition-coated clay particles has a porosity of less than 35%, preferably less than 25%, preferably less than 15%, preferably less than 5%, or even more preferably less than 1%. In some embodiments, the okra composition-coated clay particles have an average particle size (D50) in a range of 0.5 to 500 μm, preferably 1 to 100 μm, preferably 5 to 50 μm, or even more preferably 10 to 20 μm. Other ranges are also possible.

The crystalline structures of a sodium bentonite (Na-Ben), an okra composition, and a sodium bentonite modified with 10% okra composition (Na-Ben+10% okra mucilage) were characterized by the Fourier transform infrared spectra (FTIR). FTIR spectra were studied by using Fourier transform infrared spectra (Thermo-Scientific). For the Fourier transform infrared spectra characterization, the KBr discs of the samples were prepared by mixing and grounding the samples with KBr powder in mortar with pestle. The mixture was then shaped into discs under mechanical pressure. The samples discs are put into Fourier transform infrared spectra and spectral measurements were recorded in the wavenumber range of 0-4500 $cm^{-1}$. Prior to the above measurement, the samples are vacuum-dried at 60° C. for a duration of 24 h.

Figure 5:
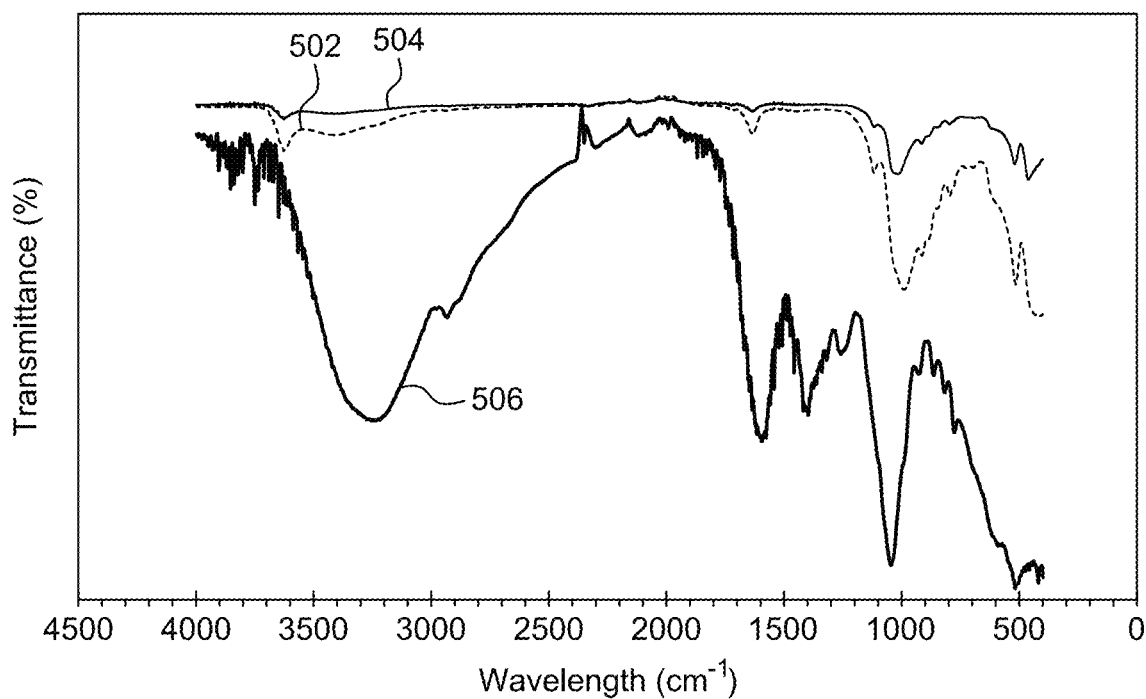
FIG. 5 is a Fourier transform infrared (FTIR) analysis of a base sample, the okra mucilage powder, and the base sample modified with 10% okra mucilage, according to certain embodiments.

In some embodiments, the Na-Ben has a first intense peak in a range of 600 to 1200 $cm^{-1}$, a second intense peak in a range of 1250 to 1750 $cm^{-1}$, and a third intense peak in a range of 3000 to 4000 $cm^{-1}$ in an FTIR spectrum, as depicted in FIG. 5. In some further embodiments, the okra composition has at least one first intense peak in a range of 400 to 600 $cm^{-1}$, a second intense peak in a range of 900 to 1200 $cm^{-1}$, a third intense peak in a range of 1300 to 1500 $cm^{-1}$, a fourth intense peak in a range of 1500 to 1700 $cm^{-1}$, and a fifth intense peak in a range of 3200 to 3500 $cm^{-1}$ in the FTIR spectrum, as depicted in FIG. 5. In some further embodiments, the sodium bentonite modified with 10% okra composition (Na-Ben+10% okra mucilage) has a first intense peak in a range of 400 to 600 $cm^{-1}$, a second intense peak in a range of 1000 to 1350 $cm^{-1}$, a third intense peak in a range of 1500 to 1750 $cm^{-1}$, and a fourth intense peak in a range of 3000 to 4000 $cm^{-1}$ in the FTIR spectrum, as depicted in FIG. 5.

Figure 4:
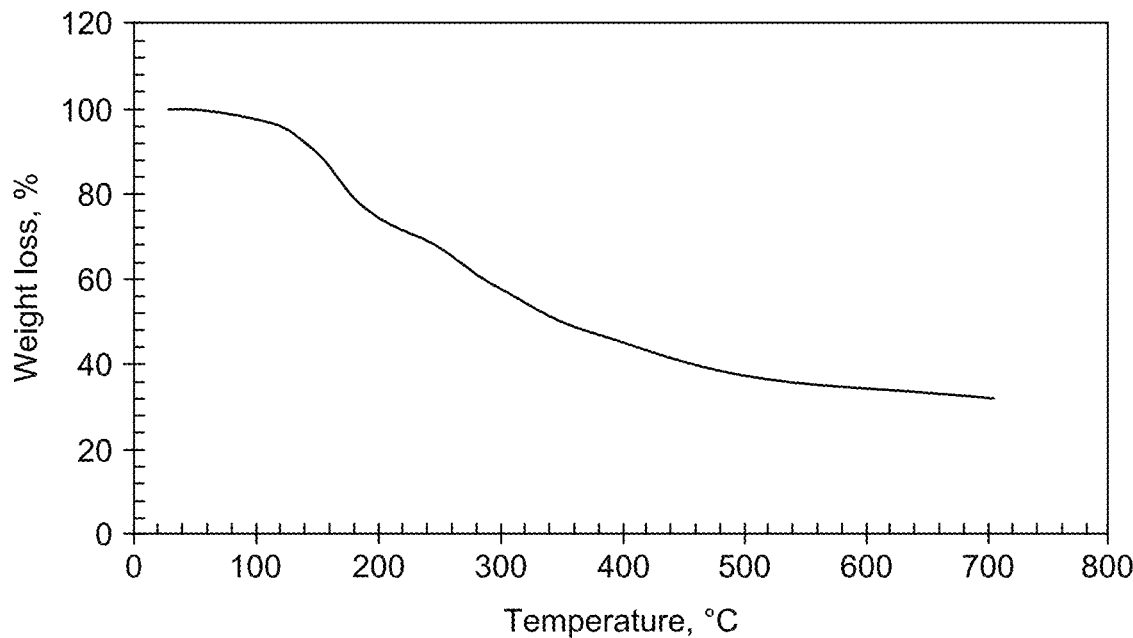
FIG. 4 is a plot depicting the thermogravimetric analysis (TGA) of the okra mucilage powder, according to certain embodiments.

The thermostability of the okra composition was characterized by thermal gravimetric analysis (TGA). TGA analysis is performed by using a thermogravimetric analyzer (8000, TA Instruments). For the TGA analysis, the samples are measured by heating at an increment frequency of 5 to 20° C./min with the flow of nitrogen in a range of 10 to 30 mL/min, and a temperature of up to 1000° C. Other ranges are also possible. In some embodiments, the okra composition has a mass loss of up to 80 wt. % based on an initial weight of the okra composition, as depicted in FIG. 4.

Figure 9:
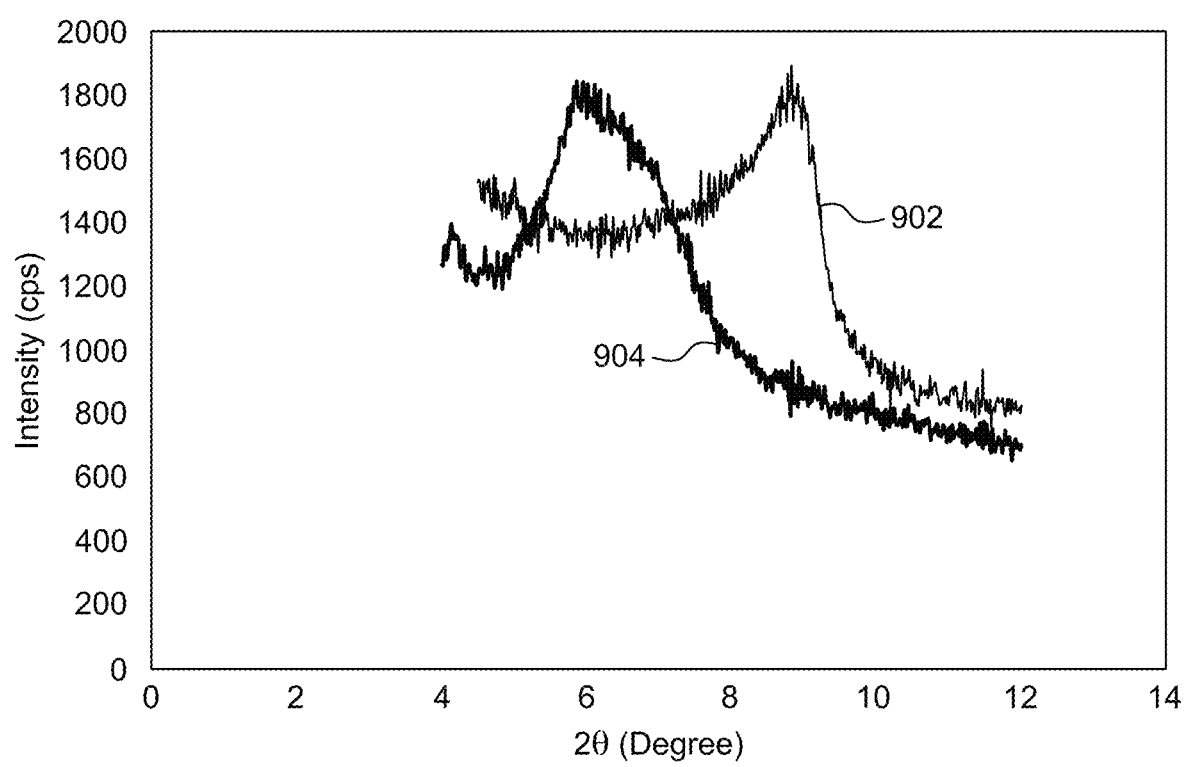
FIG. 9 shows X-ray diffraction (XRD) results of Na-bentonite and Na-bentonite modified with the okra mucilage, according to certain embodiments.

The crystalline structures of a sodium bentonite (Na-Ben), and a sodium bentonite modified with 10% okra composition (Na-Ben+10% okra mucilage) were characterized by an X-ray diffraction (XRD), respectively. In some embodiments, the XRD patterns are collected in an X-ray diffractometer equipped with a Cu-Kα radiation source (λ=0.15406 nm) for a 2θ range extending between 0 and 40°, preferably 1 and 20°, further preferably 5 and 15° at an angular rate of 0.005 to 5° s$^{-1}$, preferably 0.1 to 3° s$^{-1}$, or even preferably 1° s$^{-1}$. In some embodiments, the Na-Ben has an intense peak with a 2 theta (θ) value in a range of 5 to 10° in an X-ray diffraction (XRD) spectrum, as depicted in FIG. 9. In some embodiments, the sodium bentonite modified with 10% okra composition (Na-Ben+10% okra mucilage) has an intense peak with a 2 theta (θ) value in a range of 4 to 8° in the X-ray diffraction (XRD) spectrum, as depicted in FIG. 9. Other ranges are also possible.

A method of drilling a subterranean geological formation is described. The method includes drilling the subterranean geological formation to form a wellbore. In some embodiments, the subterranean geological formation may be a shale formation, a tar sands formation, a coal formation, a clay formation, and a conventional hydrocarbon formation. In some preferred embodiments, the subterranean geological formation is a shale formation. The drilling may be performed with a drill bit. Suitable examples of the drill bit include, but are not limited to, a twist drill, counterbore, countersink, and flat bottom boring. In some embodiments, the subterranean geological formation is drilled with the drill bit coupled to a motor. In the present disclosure, the wellbore is a portion of an oil well or a gas well, i.e., a borehole, that faces a formation matrix of the subterranean geological formation. In some embodiments, the wellbore may be a horizontal wellbore or a multilateral wellbore.

The method further includes circulating the drilling fluid composition of the present disclosure into the wellbore during the drilling. In some embodiments, the drilling fluid is circulated into the subterranean geological formation through the wellbore to maintain a temperature and pressure in the wellbore that is higher than the static pressure of the subterranean geological formation. In a preferred embodiment, the wellbore has a temperature in a range of 75-400 degrees Fahrenheit (° F.), preferably 100 to 350° F., preferably 150 to 300° F., or even more preferably 200 to 250° F. In a more preferred embodiment, the wellbore has a pressure in a range of 250 to 1,000 psi, preferably 350 to 900 psi, preferably 450 to 800 psi, or even more preferably 550 to 700 psi. Other ranges are also possible.

The method optionally includes recovering a product stream from the subterranean geological formation. In some embodiments, the product stream may include but is not limited to crude oil, natural gas, condensate, propane, butane, naphtha, kerosene, diesel, gasoline, liquified petroleum gas, asphalt, and tar.

The okra-contained drilling fluids demonstrated reduced fluid loss in different proportions at different concentrations. The cake thickness was reduced upon the addition of the okra mucilage. The low fluid loss and thin filter cake make the okra mucilage a useful solution as a fluid loss controller in water-based drilling fluids (WBDFs). Adding the okra composition also increased the viscosity and gel strength of the WBDFs. TGA analysis of the okra composition showed strong thermal stability compared to starch. The experimental results show that the okra composition mixed drilling fluids can be used as an alternate solution to conventionally used drilling fluids.

EXAMPLES

The following examples describe and demonstrate exemplary embodiments of the use of okra mucilage as a shale swelling inhibitor in drilling fluids, as described herein. The examples are provided solely for the purpose of illustration and are not to be construed as limitations of the present disclosure, as many variations thereof are possible without departing from the spirit and scope of the present disclosure.

Example 1: Materials and Methods

Figure 2:
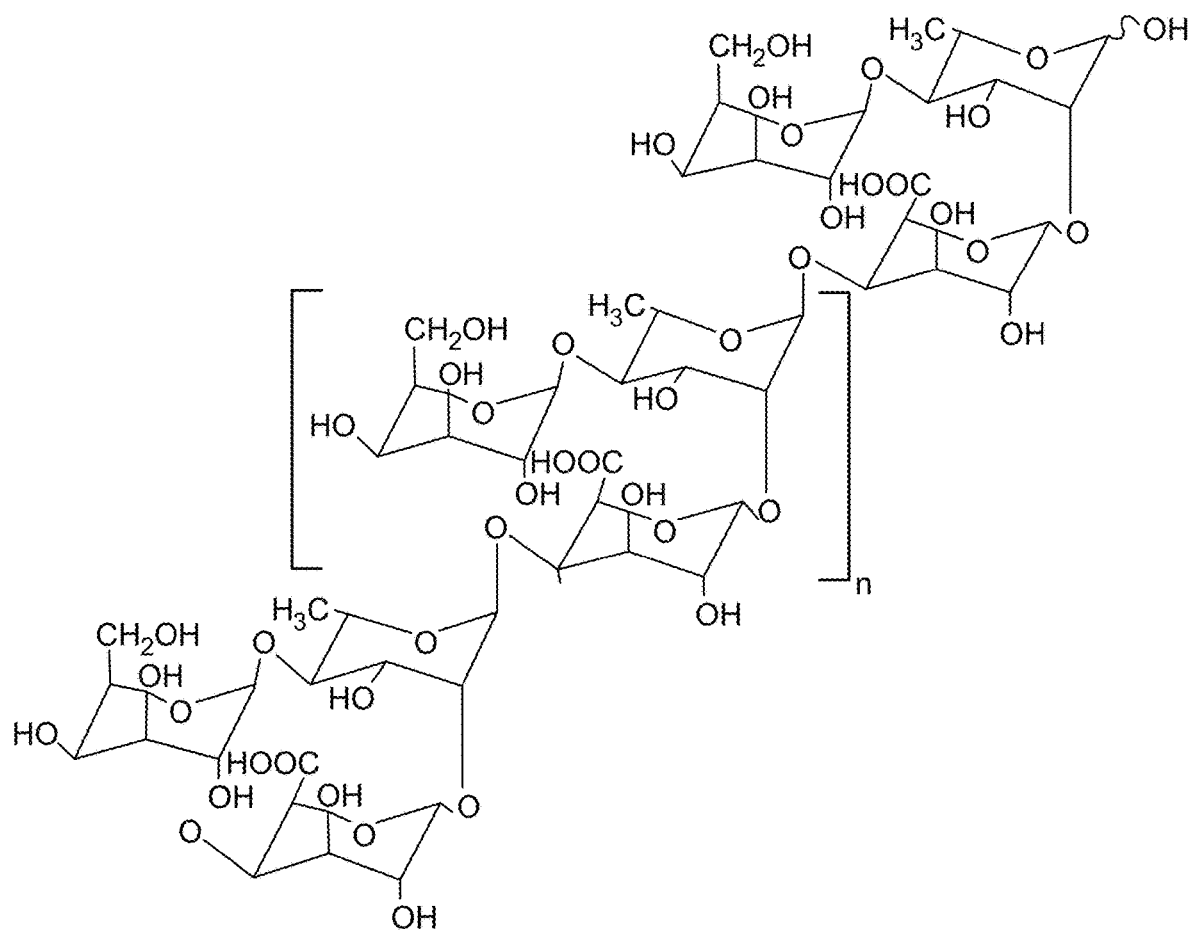
FIG. 2 illustrates the polysaccharide chemical structure of an okra mucilage, according to certain embodiments.

The okra was purchased from a local market in Saudi Arabia. The chemical structure of a polysaccharide present in okra is shown in FIG. 2. Halliburton, Saudi Arabia, provided the sodium bentonite (Na-Ben) clay to study the modified WBM's inhibition performance. NaOH was used to stabilize the pH of drilling muds and was purchased from Sigma Aldrich. In all the investigations, distilled water was used to prepare drilling muds and solutions.

Example 2: Preparation of the Okra Mucilage

To prepare the okra mucilage, the okra was washed with distilled water to remove any dust particles as shown in FIG. 3. The okra was heated in distilled water at 40° C. for several hours to extract the mucilage. After that, the mucilage was filtered out from solid remains using a muslin cloth. The mucilage was later diluted with distilled water to prepare different concentrations (5, 10 & 20) vol. % of the okra mucilage. For specified inhibition qualities, drilling mud samples were mixed with the okra mucilage. Two different types of drilling mud were prepared by the method of the present disclosure. The base drilling mud (BM) was first mixed by adding 6% bentonite in distilled water in a Beach Hamilton mixer at 21,000 RPM. Second, okra mucilage-based drilling muds were prepared by mixing 6% bentonite in the okra mucilage solutions with concentrations of (10 and 20) %. After 30 min of vigorous stirring, all the drilling mud samples' pH was adjusted to 9 using sodium hydroxide (NaOH) as a base. Before performing the drilling mud test, each drilling mud sample was held at room temperature for 24 h. The formulation of drilling fluids is given in Table 2.

TABLE 2

| Additive | Base drilling mud (BM) | 10% okra mucilage-based drilling muds | 20% okra mucilage-based drilling muds |
| --- | --- | --- | --- |
| Water (ml) | 350 | 340 | 330 |
| Bentonite (g) | 21 | 21 | 21 |
| NaOH (g) | | As required | |
| Okra mucilage (wt. %) | 0 | 10 | 20 |

Drilling fluids formulations

Example 3. Thermal Gravimetric Analysis (TGA) of the Okra Mucilage

The thermal decomposition of the okra mucilage was studied using TGA. For this purpose, the okra mucilage powder was obtained after removing all the water contents, which were almost 88-90%. TGA 8000™ Thermogravimetric analyzer was used to investigate the thermal stability. A small amount of the okra mucilage powder sample (2.5 mg) was placed on an aluminum pan in the TGA and heated from 25° C. to 700° C. at the rate of 10° C./min. The nitrogen gas was used at the flow rate of 20 ml/min as the purge gas during the TGA.

Example 4: Scanning Electron Microscopic (SEM) Studies

The morphological study of filter cakes obtained after filtration experiments were performed using an SEM. Filter cakes dried at room temperature were placed in a metal stub, and carbon coating was performed to make the samples more conductive and for high-resolution images. The SEM was performed using the QEMSCAN instrument.

Example 5: Measurement of Rheology

A concentric cylinder viscometer (M900) was used for rheology measurements such as plastic viscosity (PV) and yield stress (YP). Three different formulations (BM, 10% okra mucilage-based drilling mud, and 20% okra mucilage-based drilling mud) were tested for rheology. Table 3 provides the details on the composition of tested formulations. Equations (1-2) were utilized to calculate various rheological parameters.

$$\text{Plastic viscosity } (\mu_p) = \phi_{600} - \phi_{300}(cp) \quad \text{Eq. (1)}$$

$$\text{Yield pint } (Y_p) = \phi_{300} - \mu_p \left(\frac{\text{lb}}{100 \text{ ft}^2}\right) \quad \text{Eq. (2)}$$

Example 6: Filtration Test

The Fann filter press was used to evaluate the filtration properties of drilling fluids. The detailed procedure of filtration experiments is provided [Murtaza M, Ahmad H M, Kamal M S, Hussain S M S, Mahmoud M, Patil S. Evaluation of clay hydration and swelling inhibition using quaternary ammonium dicationic surfactant with phenyl linker. Molecules 2020; 25:4333, which is incorporated herein by reference in its entirety].

Example 7: Linear Swelling Test

The OFITE linear swell tester was used to determine the swelling characteristics. The detailed procedure is provided [Murtaza M, Ahmad H M, Kamal M S, Hussain S M S, Mahmoud M, Patil S. Evaluation of clay hydration and swelling inhibition using quaternary ammonium dicationic surfactant with phenyl linker. Molecules 2020; 25:4333, which is incorporated herein by reference in its entirety]. At different concentrations of okra mucilage fluids (5% okra mucilage, 10% okra mucilage, and 20% okra mucilage), the linear swelling rate of bentonite pellets was measured for 24 h. The performance of the okra mucilage was compared with distilled water.

Example 8: Zeta Potential and Particle Size Tests

Litesizer 500 was used to evaluate the zeta potential at 22° C. Further, clay particle sizes in all four samples were determined using the same equipment at the same temperature conditions.

Example 9. Capillary Suction Timer (CST) Test

The CST test was performed to describe the practical inhibitory qualities of the okra mixed fluids. The OFITE CST instrument was used to characterize the okra mucilage. Several formulations were tested in this study by adding various concentrations (5, 10 & 20) % of the okra mucilage in the base fluid prepared by mixing 2 g of bentonite in distilled water and thoroughly mixing them before conducting the CST test.

Example 10: Lubricity Test

During drilling operations, torque and drag problems cause wear and tear on a drill string. This problem amplifies in deviated wells. Drill string wear is primarily influenced by drill pipe rotation, horizontal drilling, and tripping in and out of the hole. Reducing the torque developed due to friction can be subdued by adding various lubricants such as graphite, fine mica, and diesel or crude oil. A lubricity test was devised to replicate the drill pipe's rotational speed and pressure against the bore hole's wall. The OFITE Lubricity Tester was used to perform the lubricity test. The lubricity test, more commonly used, tests the fluid resistance of various lubricating additives. The conventional lubricity coefficient test is performed at 60 rpm with 150 in-lb. of force applied to two hardened steel surfaces, a spinning ring, and a stationary block. The fluid is rotated during the test, affecting the drag between hardened surfaces.

Example 11: Characterization of the Okra Mucilage

The thermal stability of the okra mucilage powder was studied using TGA. FIG. 4 shows that the TGA curve of the okra mucilage has three major mass-loss events at different temperatures. The first slight weight loss of the okra mucilage was due to the loss of water contents around 100° C. The second weight-loss event was observed during the temperature range of 170° C. to 250° C. on the TGA curve. The weight loss at the temperature range of 170° C. to 250° C. was mainly due to the decomposition of polysaccharide complexes in the okra mucilage structure. The third major weight loss event in the TGA occurred at temperatures ranging from 250° C. to 450° C. The weight loss at this temperature range was mainly due to the loss of carbon residues in the okra mucilage powder [Zaharuddin N D, Noordin M I, Kadivar A. The use of *Hibiscus esculentus* (Okra) gum in sustaining the release of propranolol hydrochloride in a solid oral dosage form. BioMed Res Int 2014; 2014:735891; Li M, Fan Y, Xu F, Sun R. Structure and thermal stability of polysaccharide fractions extracted from the ultrasonic irradiated and cold alkali pretreated bamboo. J Appl Polym Sci 2011; 121:176-85; and Archana G, Sabina K, Babuskin S, Radhakrishnan K, Fayidh M A, Babu P A S, et al. Preparation and characterization of mucilage polysaccharide for biomedical applications. Carbohydr Polym 2013; 98:89-94, which are incorporated herein by reference in their entirety]. The overall results of TGA show that the okra mucilage powder would be stable up to the temperature of 250° C. and can be used for high-temperature drilling fluid applications.

The FTIR analysis was performed on three samples: the base mud without the okra mucilage (502), the okra mucilage (506), and the mud modified with 10% okra mucilage (504). The result of this study is depicted in FIG. 5. The FTIR was conducted on dry samples. The okra mucilage (506) was mainly composed of three constituents: galacturonic acid, rhamnose, and galactose. The most important functional group, which is found in all the constituents of the okra mucilage, is the (—OH) hydroxyl group. The main peak in the FTIR spectrum of the okra mucilage (506) was found at 3335 cm$^{-1}$ due to the presence of the (—OH) group in the aromatic sugar groups of the okra mucilage (506). The small peak observed around 2900 cm$^{-1}$ was due to the C—H bond stretching present in the rhamnose and galactose. The medium peak observed at 1720 cm$^{-1}$ was mainly due to the C═O bond stretching present in the galacturonic acid. The major peak observed from 1200 cm$^{-1}$ to 1000 cm$^{-1}$ was due to the C—O bond stretch of aromatic compounds, mainly found in galacturonic acid, rhamnose, and galactose. The FTIR analysis of base mud (502), mainly composed of bentonite, reveals that the peak at 1120 cm$^{-1}$ was due to the Si—O—Si bond stretch, which confirms the presence of silica. The small peaks in the range of 700 cm$^{-1}$ to 650 cm$^{-1}$ are mainly attributed to the linkages between alumina silicates. The presence of the —OH group was confirmed by the peaks at 3692 cm$^{-1}$. The FTIR analysis of the base mud (bentonite) modified with 10% okra mucilage (504) also shows all the peaks found in the FTIR spectra of bentonite and okra mucilage. A small peak at 3156 cm$^{-1}$ represents the hydrogen bonding among the polysaccharides, and the aluminosilicate of bentonite confirms the chemical interactions of the okra mucilage and the bentonite powder.

Figure 6A:
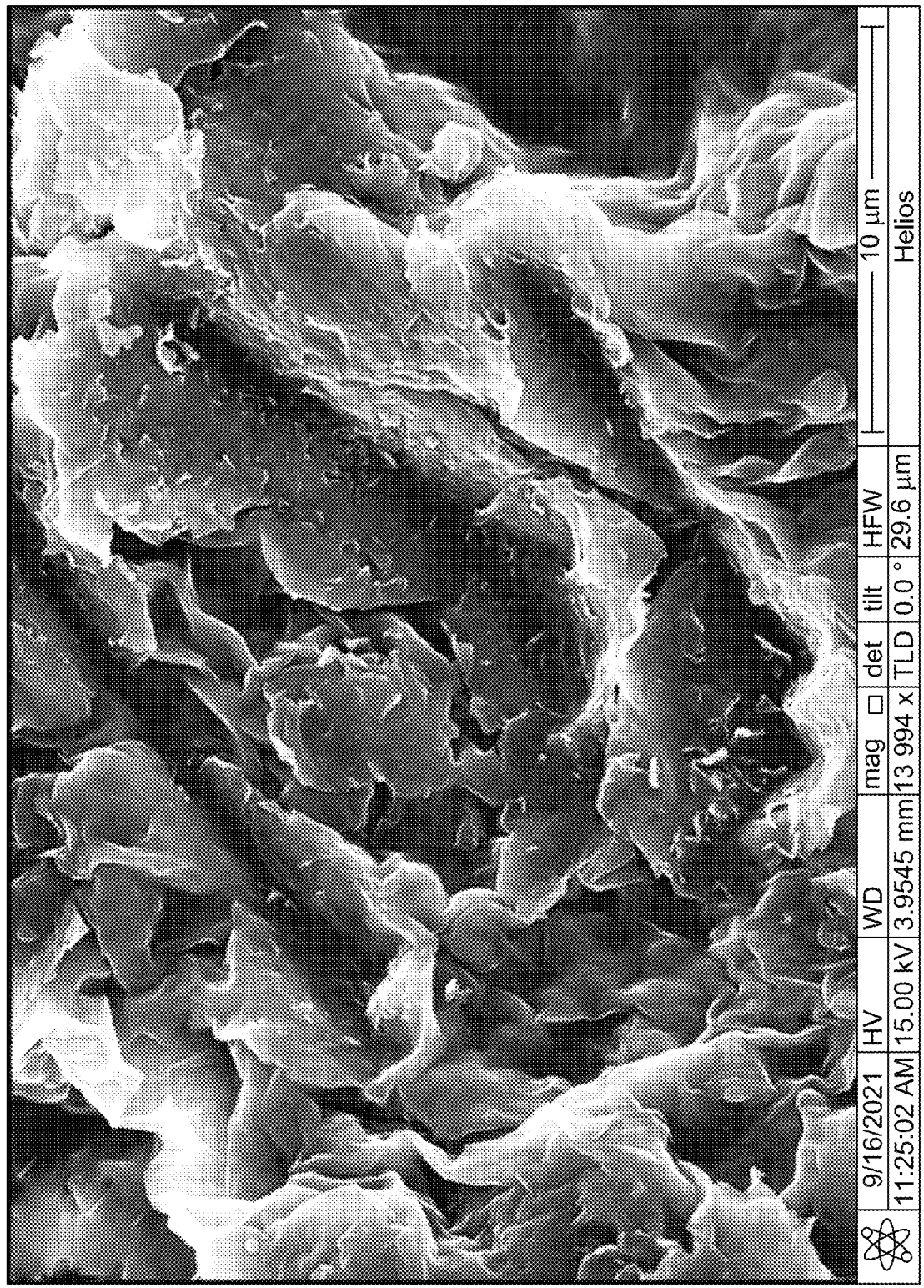
FIGS. 6A and 6B are scanning electron micrograph (SEM) images of filter cakes, according to certain embodiments.
Figure 6B:
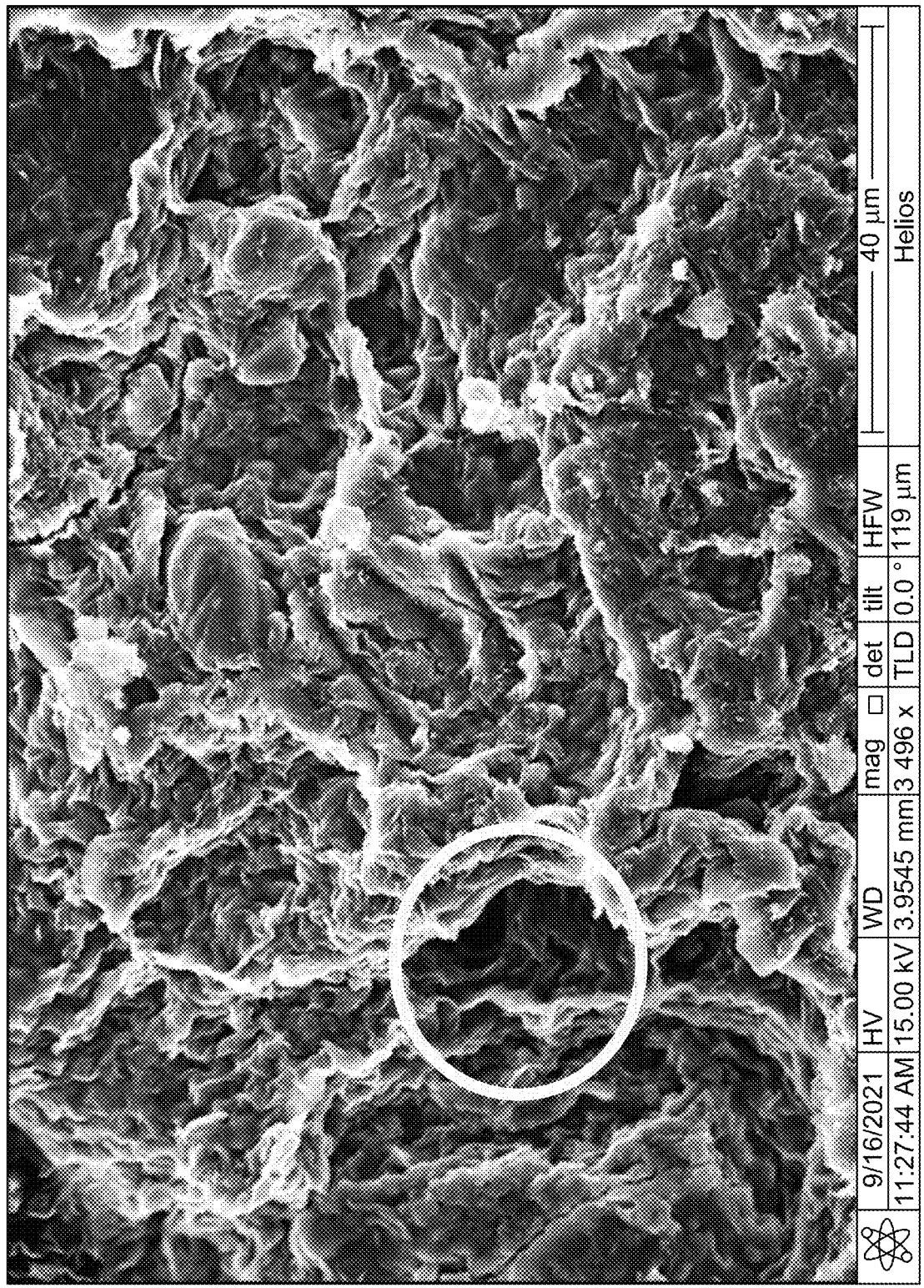

SEM of filter cakes was performed to study the microstructure of bentonite and the okra mucilage and their mutual interactions. FIGS. 6A and 6B show two images of the base mud at two different resolutions. FIG. 6A, the SEM image with higher resolution, shows the presence of bentonite flakes and layers randomly arranged with few defects on the filter cake, as shown with a circle. This led to an increase in the filtrate volume of base mud formulation. The filter cake obtained from the base mud formulation has an open or less compacted structure of bentonite flakes, resulting in higher fluid loss to the wellbore formation.

Figure 6C:
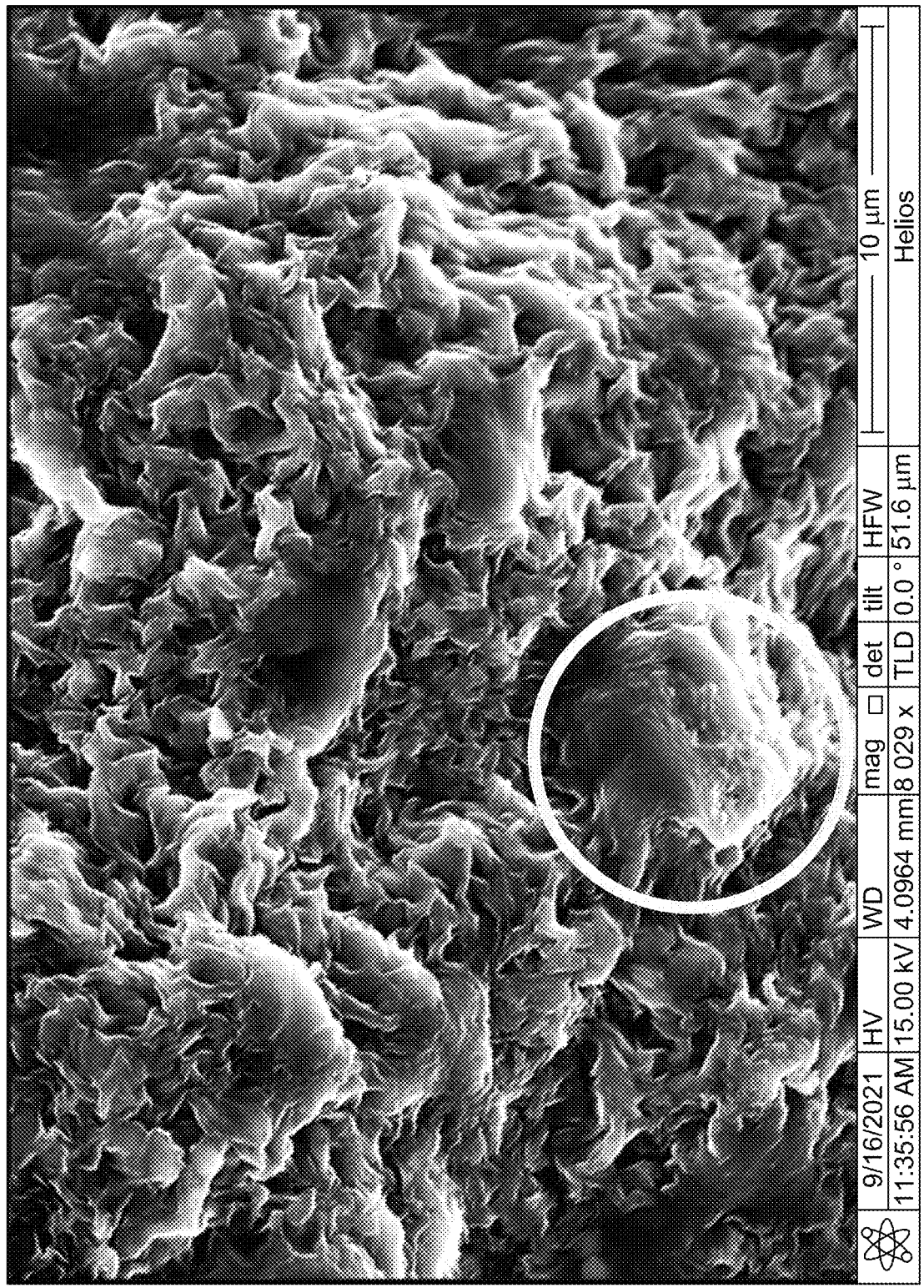
FIG. 6C is an SEM image of base muds, according to certain embodiments.
Figure 6D:
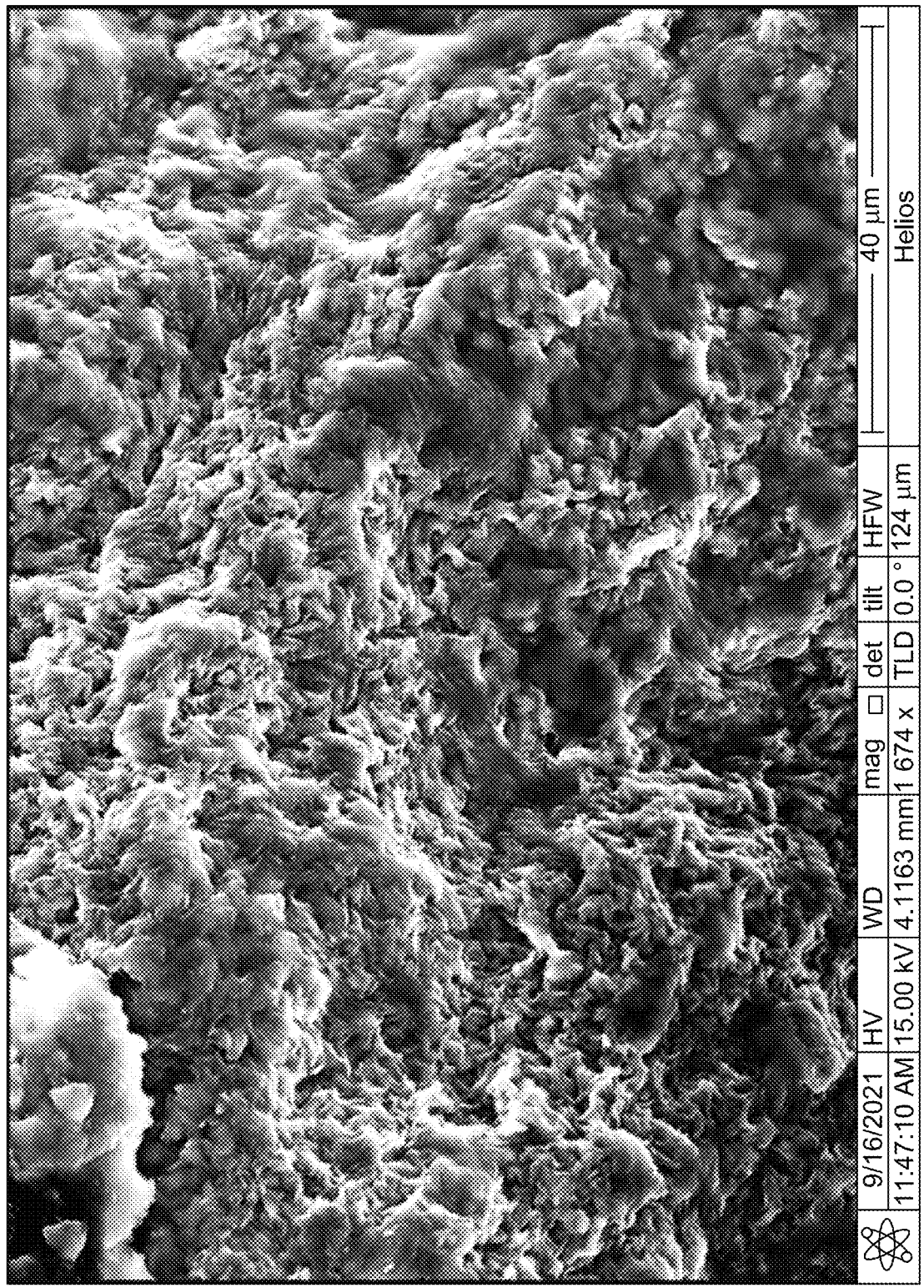
FIG. 6D is an SEM image of the base mud modified with 10% okra mucilage, according to certain embodiments.

FIGS. 6C and 6D show the filter cakes of the base mud modified with the okra mucilage powder at two different resolutions. The presence of the okra mucilage in the base muds resulted in the formation of agglomerates between bentonite flakes and long chains of the okra mucilage. Okra mucilage mainly contains complex polysaccharides with functional groups alongside the chain. These functional groups interact with bentonite platelets and form a compact structure on the filter cake, thereby reducing the fluid loss to the wellbore formations. The filter cake of base mud modified with the okra mucilage resulted in a highly compact structure with fewer defects in the filter cake. Therefore, using the okra mucilage powder in the drilling fluid formulations was a suitable choice as it resulted in less fluid loss with compact filter cake.

Example 12: Linear Swelling Test

Figure 7:
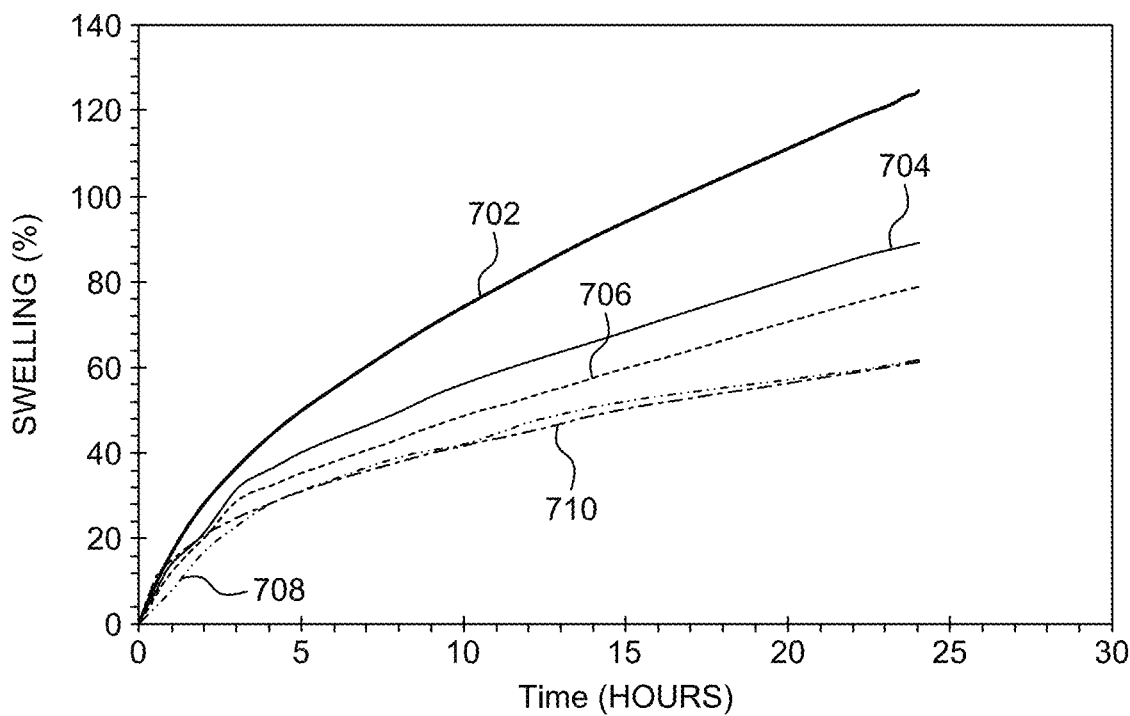
FIG. 7 is a plot depicting a linear swelling trend of the base mud and the okra mucilage mixed drilling mud, according to certain embodiments.

FIG. 7 provides the linear swelling chart, conducted using water (702) and the okra mucilage mixed fluids. Three different concentrations (5, 10 & 20) wt. % corresponding to reference numerals (704, 706, and 708 in FIG. 7) of the okra mucilage mixed fluid were investigated. It was noticed that adding the okra mucilage reduced the swelling of Na-bentonite compared to swelling resulting from distilled water. The swelling of Na-bentonite was decreased by 28.5%, 36.8%, and 50.5%, respectively, for the samples with 5, 10, and 15% okra mucilage. The swelling reduction shows the okra mucilage's inhibition potential and makes it a competitive green inhibitor. The performance of the okra mucilage was comparable with sodium silicate and potassium chloride solutions. It was reported by [Moslemizadeh A, Shadizadeh S R. A natural dye in water-based drilling fluids: swelling inhibitive characteristic and side effects. Petroleum 2017; 3:355-66, which is incorporated herein by reference in its entirety] that 2% sodium silicate decreased the swelling of Na-bentonite by 26.9%. The high concentration of sodium silicate affects the drilling mud's rheology by increasing its pH. The swelling inhibition observed with 20% okra mucilage was comparable to the results obtained with 7% KCl (710). Also, certain drawbacks associated with using KCl for swelling inhibition, such as balling, were not observed with the okra mucilage and can be effectively applied at high concentrations.

Example 13: CST, Zeta Potential, and Particle Size Tests

The capillary suction timer (CST) test demonstrates and characterizes the shale inhibitor's swelling-inhibiting properties [Murtaza M, Kamal M S, Hussain S M S, Mahmoud M, Syed N A. Quaternary ammonium gemini surfactants having different spacer length as clay swelling inhibitors: mechanism and performance evaluation. J Mol Liq 2020; 308:113054, which is incorporated herein by reference in its entirety]. The results indicated that the base fluid had a long capillary suction time of 224 s, as shown in Table 3.

TABLE 3

CST, zeta potential, and particle size of the okra mucilage mixed solutions

| Fluids | Zeta potential (mV) | CST seconds | Particle size D50 (μm) |
| --- | --- | --- | --- |
| Base fluid | −30.9 | 224.5 | 1.2 |
| 5% okra mucilage mixed solution | −27.5 | 69.7 | 1.49 |
| 10% okra mucilage mixed solution | −23.6 | 120 | 2.46 |
| 20% okra mucilage mixed solution | −18.3 | 271.7 | 4.24 |

However, when 5% okra mucilage was added to the base fluid, a significant decrease in the CST time, from 224.5 s to 69.7 s, was observed. Upon increasing the concentration of the okra mucilage, the CST time also increased to 120 s and 271.7 s with the solutions mixed with 10% and 20% okra mucilage, respectively. The increase in the CST value was due to the increase in viscosity of the solution at higher concentrations of the okra mucilage. A similar phenomenon was observed in filtration tests. The results confirmed the superior inhibitory activity with the okra mucilage.

Zeta potential (ζ) indicates coagulation, dispersion, surface modification, and colloidal stability [Mohammed I, Al Shehri D A, Mahmoud M, Kamal M S, Alade O. Surface charge investigation of reservoir rock minerals. Energy Fuels 2021; 35:6003-21, which is incorporated herein by reference in its entirety]. An aqueous suspension of the Na-Ben clay in distilled water displayed a highly negative zeta potential of −30.9 mV. The highly negative value indicates a higher double-layer thickness, increased swelling, and dispersion of clay particles [Zhong H, Qiu Z, Huang W, Cao J. Shale inhibitive properties of polyether diamine in the water-based drilling fluid. J Petrol Sci Eng 2011; 78:510-5, which is incorporated herein by reference in its entirety]. However, adding the okra mucilage solution lowered the zeta potential and reduced the value to a less negative value, i.e., −23.6 mV for the solution with 10% okra mucilage. The decrease in the negative value of the zeta potential after adding the okra mucilage showed reduced repulsive forces between the clay particles. The particle size distribution describes the suspensions' coalescence stability.

Figure 8:
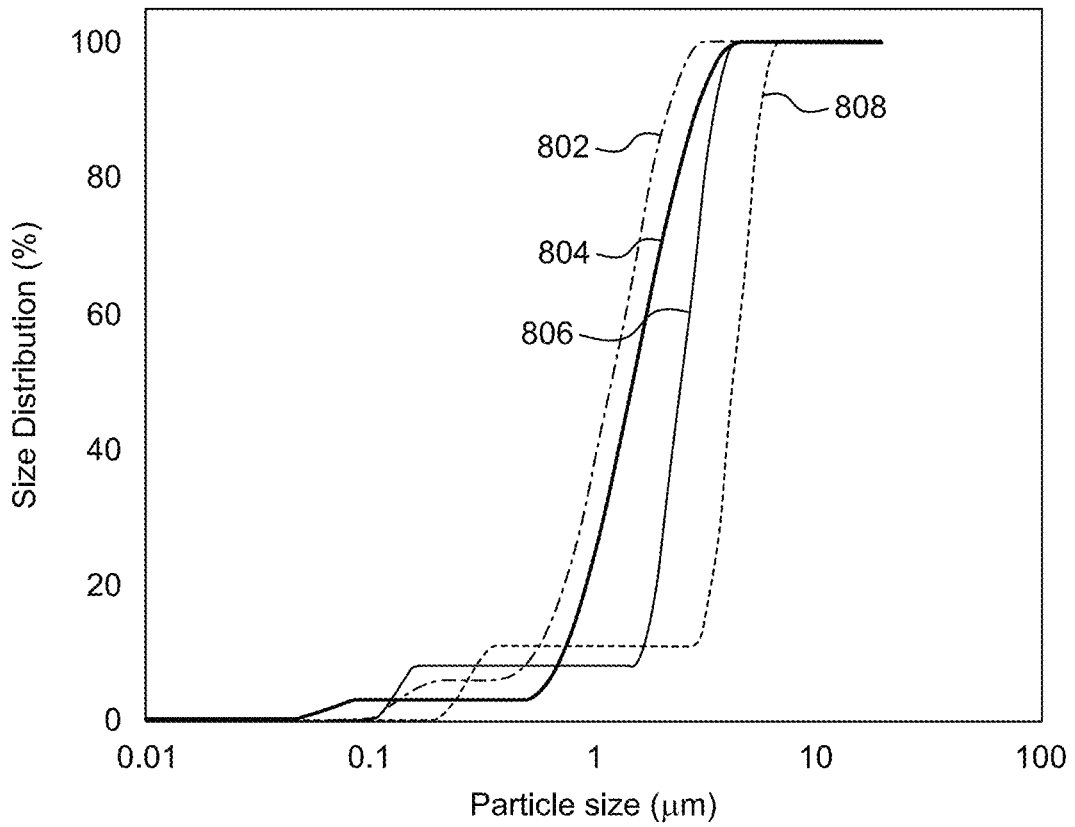
FIG. 8 shows a particle size distribution of okra mix fluids, according to certain embodiments.

FIG. 8 provides the differential distribution of the okra mucilage mixed drilling fluids. The particle size of Na-bentonite changed when the okra mucilage was added to the drilling fluids. Table 4 shows the particle size distribution for several okra mucilage-based drilling fluids at D50 diameter. Adding the okra mucilage agglomerated the bentonite particles, resulting in a larger particle size. The base fluid (802) demonstrated a mean particle size (D50) of 1.20 μm, while the mean particle size of the 5% okra mucilage solution (804), 10% okra mucilage solution (806), and 20% okra mucilage solution (808), is 1.49 μm, 2.46 μm, and 4.24 μm, respectively. The ability of the okra mucilage to weaken the Na-bentonite suspension caused clay particle coalescence, which was consistent with the zeta potential results, indicating that the addition of the okra mucilage coagulated Na-bentonite particles by reducing their surface charge.

Example 14: Rheology and Filtration

The rheological properties of the okra mucilage containing WBMs were investigated, and the results were compared to a control (base mud devoid of the okra mucilage), as shown in Table 4.

TABLE 4

PV, YP, GS, and fluid loss of tested drilling fluids (BM, 10% okra mucilage-based drilling muds, and 20% okra mucilage-based drilling muds)

| Parameters (units) | Base drilling mud (BM) | 10% okra mucilage-based drilling muds | 20% okra mucilage-based drilling muds |
|---|---|---|---|
| PV (cP) | 10.5 | 11.4 | 11.9 |
| YP (lbf/100 ft$^2$) | 4.28 | 5.08 | 6.09 |
| YP/PV (lbf/100 ft$^2$)/cP | 0.41 | 0.44 | 0.51 |
| 10 seconds gel (lbf/100 ft$^2$) | 1 | 1 | 2 |
| 10 minutes gel (lbf/100 ft$^2$) | 6 | 7 | 10 |
| Fluid loss (ml) | 13.2 | 12.4 | 11.4 |
| Fluid cake (inch) Thickness 1/32 | 3/32 | 2/32 | 1/32 |

At 120° F. and 14.7 pounds per square inch (psi), various rheological properties of drilling muds were investigated. Rheological properties provide critical information about pumpability, friction losses, and the effect of shale inhibitors on wellbore cleaning and carrying capacity. Plastic viscosity (PV) is a measure of flow resistance, and the nature of the solids in WBM has a significant effect on it. As can be observed from Table 4, the addition of the okra mucilage improved the PV, and the increase was found to be concentration-dependent, which can be attributed to the increase in okra mucilage's viscosity. Adding 15 ml of the okra mucilage to the base mud slightly increased the PV to 11.4 cP from 10.5 cP. The slight increase in PV provides the drilling fluids with increased carrying capacity.

The yield point (YP) value denotes the minimum shear stress required to initiate fluid flow. This parameter indicates the fluid ability to suspend solids in a dynamic state. The addition of the okra mucilage had a minor effect on the YP. The YP increased with the addition of the okra mucilage. As can be observed from Table 4, the addition of 20% okra mucilage increased the YP to 6.09 lbf/100 ft$^2$ from 4.28 lbf/100 ft$^2$ (base drilling mud). The gel strength is used to quantify the attractive forces within the WBM at static conditions. A critical characteristic of drilling fluid indicates its ability to suspend cuttings in static conditions or when circulation is interrupted. In other words, gel strength is a measure of the attractive forces under static- or non-flow conditions, whereas, on the other hand, YP is a measurement of attractive forces under flowing conditions. The gel strength of the drilling fluid was studied at different time intervals (10 seconds and after 10 minutes), further to the addition of the okra mucilage. From Table 4, it can be observed that the gel strength increased upon the addition of the okra mucilage with time, after 10 s, and after 10 minutes. It is important to note that while the okra mucilage only slightly altered the rheological parameters, a significant change in rheological characteristics can render the drilling mud unfit for use. The results indicate that adding the okra mucilage to the based mud increased its cuttings carrying capacity and improved its suitability for drilling. The YP/PV ratio measures carrying capacity, crucial to wellbore cleaning [Avci E, Mert B A. The rheology and performance of geothermal spring water-based drilling fluids. Geofluids 2019; 2019:1-8, which is incorporated herein by reference in its entirety]. The calculation of YP/PV in Table 4 demonstrated that the base mud sample has the lowest value, a low YP/PV ratio that affects the penetration rate by providing improper wellbore cleaning. Adding the okra mucilage increased the YP/PV ratio to 0.51 and improved the carrying capacity of the drilling fluids. The drilling mud's filtration behavior is crucial as it affects the formation, drilling mud rheology, and drilling operation. The increased fluid loss could result in severe damage [Ahmed Khan R, Murtaza M, Abdulraheem A, Kamal M S, Mahmoud M. Imidazolium-based ionic liquids as clay swelling inhibitors: mechanism performance evaluation, and effect of different anions. ACS Omega 2020; 5: 26682-96, which is incorporated herein by reference in its entirety]. Table 4 provides the filtration test results. The results showed that the okra mucilage-based drilling mud displayed lower fluid loss than base mud. The fluid loss decreased with the addition of the okra mucilage. Similarly, the thickness of the filter cake decreased with the addition of the okra mucilage to the drilling mud due to fluid loss of the drilling fluid. A thin filter cake is needed in drilling fluid to prevent sticking and problems associated with high torque. The outcomes of the fluid loss test agree with the results obtained in the rheological study.

Example 15: X-Ray Diffraction (XRD)

Figure 10:
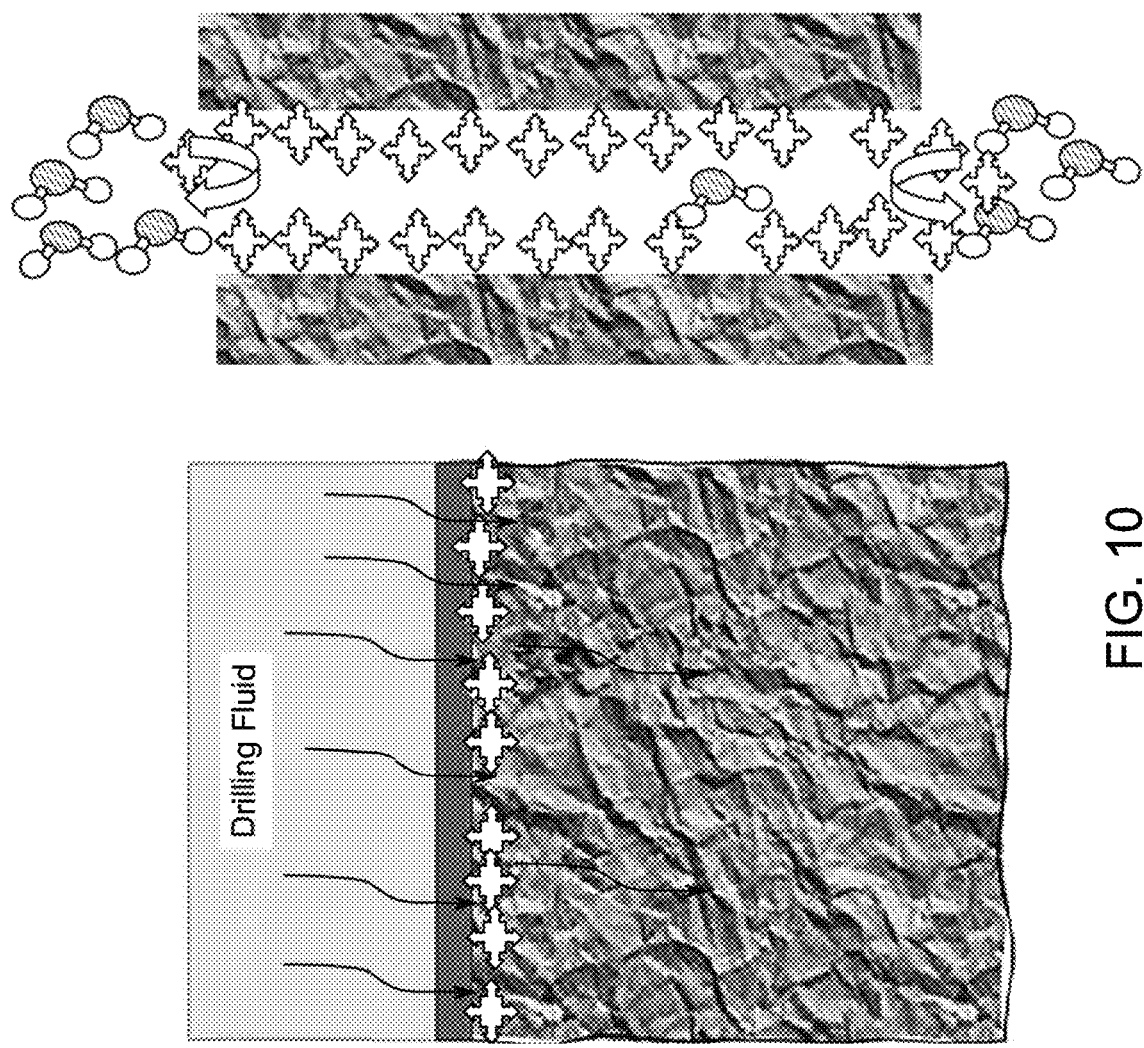
FIG. 10 is a pictorial image showing the okra mucilage inhibition mechanism on bentonite swelling, according to certain embodiments.

In XRD analysis, the d spacing or basal spacing ($d_{001}$) was calculated using the Braggs Equations ($n\lambda = 2d \sin \theta$). With intercalation of the okra mucilage, the basal spacing of clay moves to lower angles showing the increase in interlayer spacing (FIG. 9). The literature has reported that intercalation increased d spacing [Williams-Daryn S, Thomas R K. The intercalation of vermiculite by cationic surfactants and its subsequent swelling with organic solvents. J Colloid Interface Sci 2002, which is incorporated herein by reference in its entirety]. The basal spacing increased from 12.04 to 19 Å with 10% okra mucilage. This increase in basal spacings indicates the intercalation of the okra mucilage into bentonite interlayers. As a result, the okra mucilage has a strong anti-swelling effect on bentonite. It draws water out of the interlayer, forming a hydrophobic surface and further preventing the bentonite from swelling, as shown In FIG. 10.

Example 16: Lubricity Test

OFITE Lubricity Tester investigated the lubrication potential of the okra mucilage. The okra mucilage lubrication was compared against distilled water as a reference. The friction coefficient of water was 0.34, while the okra mucilage demonstrated a lesser friction coefficient with a value of 0.19. The low friction coefficient showed that the okra mucilage has the potential of a natural lubricating agent. It can be used in drilling mud to reduce the friction between the drill string and the wellbore wall.

To summarize, this study used the okra mucilage as a shale swelling inhibitor. A linear swelling test, a capillary suction timer, zeta potential, XRD, and SEM were conducted to determine the inhibitory potential of the okra mucilage. Additionally, rheological and fluid loss-control potential were determined. Okra mucilage significantly reduced bentonite swelling compared to water. The capillary suction timer dropped upon adding the okra mucilage and increased afterward when the concentration increased. The addition of the okra mucilage altered the surface charge of clay and made it less negative. The particle size of the clay increased, indicating that clay swelling was inhibited. The interlayer spacing increased with the okra mucilage showing the intercalation and strong hydrogen bonding of the okra mucilage. The reduction in fluid loss showed the inhibition potential of the okra mucilage in drilling mud. The rheology improved, which showed the excellent carrying capacity of mud mixed with okra mucilage. The okra mucilage reduced the friction coefficient and showed potential application as a natural lubricating agent.

Numerous modifications and variations of the present disclosure are possible in light of the above teachings. It is therefore to be understood that within the scope of the appended claims, the invention may be practiced otherwise than as specifically described herein.

The invention claimed is:

1. A drilling fluid composition, comprising:
   an aqueous base fluid;
   1 to 30 wt. % of an okra composition;
   0.5 to 10 wt. % of clay particles; and
   0.005 to 0.5 wt. % of a base;
   wherein each wt. % is based on a total weight of the drilling fluid composition; and
   wherein the okra composition is uniformly disposed on surfaces of the clay particles;
   wherein the clay particles disposed with the okra composition are present in the drilling fluid composition in the form of a composite; and
   wherein a pellet made from the clay particles treated with the okra composition has a swelling value at least 75% less than a swelling value of the pellet in an aqueous composition that does not contain the okra composition, as determined by a linear swell meter.

2. The drilling fluid composition of claim 1, wherein:
   the okra composition is an okra extract;
   the clay is sodium bentonite; and
   the base is sodium hydroxide.

3. The drilling fluid composition of claim 2, comprising:
   5 to 20 wt. % of the okra extract;
   3 to 5 wt. % of sodium bentonite; and
   0.02 to 0.1 wt. % of sodium hydroxide;
   wherein each wt. % based on a total weight of the drilling fluid composition.

4. The drilling fluid composition of claim 1, wherein the okra composition is at least one selected from the group consisting of an okra extract, an okra pressing, an okra homogenate, and any combination thereof.

5. The drilling fluid composition of claim 1, wherein the okra composition comprises at least one polysaccharide selected from the group consisting of galacturonic acid, galactose, rhamnose, and arabinose.

6. The drilling fluid composition of claim 5, wherein the at least one polysaccharide of the okra composition has a molecular weight in a range of 500 to 5000 kilodalton (KDa).

7. The drilling fluid composition of claim 1, wherein the okra composition has a total sugar content of at least 60 wt. % based on a total weight of the okra composition, and wherein the sugar is a polysaccharide.

8. The drilling fluid composition of claim 1, wherein the clay comprises sodium bentonite, calcium bentonite, potassium bentonite, sodium montmorillonite, calcium montmorillonite, or a combination thereof.

9. The drilling fluid composition of claim 1, wherein the base is an alkali metal hydroxide, an alkaline earth metal hydroxide, an alkali metal oxide, an alkaline earth metal oxide, an alkaline earth metal carbonate, or a mixture thereof.

10. The drilling fluid composition of claim 1, wherein the aqueous base fluid comprises one or more selected from the group consisting of a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitor, a catalyst, a surfactant, a preservative, a biocide, a thermal stabilizer, and a combination thereof.

11. The drilling fluid composition of claim 1, having a capillary suction time in a range of 50 to 300 seconds.

12. The drilling fluid composition of claim 1, having a zeta potential in a range of −50 to −10 millivolts (mV).

13. The drilling fluid composition of claim 1, having a zeta potential in a range of −30 to −15 mV.

14. The drilling fluid composition of claim 1, having an average particle size (D50) in a range of 1 to 5 micrometers (μm).

15. The drilling fluid composition of claim 1, having an average particle size (D50) in a range of 1.5 to 4.5 μm.

16. A method of making the drilling fluid composition of claim 1, comprising:
   dispersing the clay particles in the aqueous base fluid to form a suspension;
   wherein the suspension has an average particle size (D50) in a range of 0.5 to 2 μm;
   neutralizing the pH of the suspension with the base; and
   mixing an okra mucilage containing the okra composition with the suspension to form the drilling fluid composition;
   wherein the okra composition is present in the okra mucilage at a concentration of 0.1 to 10 g/ml.

17. The method of claim 16, further comprising:
   preparing the okra mucilage containing the okra composition by:
   pulverizing okra and heating in water at a temperature of at least 35° C. to form an okra containing mixture; and
   filtering the okra containing mixture to form the okra mucilage containing the okra composition.

18. A method of drilling a subterranean geological formation, the method comprising:
   drilling the subterranean geological formation to form a wellbore therein; and
   circulating the drilling fluid composition of claim 1 into the wellbore during the drilling.

19. The method of claim 18, wherein the wellbore has a temperature in a range of 75-400° F., and a pressure in a range of 250-1,000 psi.

20. The method of claim 18, wherein the subterranean geological formation is a shale formation.

\* \* \* \* \*